(No Model.)  
10 Sheets—Sheet 1.

N. J. SIMONDS.
MOLDING STIFFENERS FOR BOOTS OR SHOES.

No. 292,514. Patented Jan. 29, 1884.

FIG. 1.

WITNESSES.  
Samuel D. Kelley,  
Eugene H. Humphrey

INVENTOR.  
Nathan J. Simonds  
per Porter & Hutchinson  
Attys.

(No Model.) 10 Sheets—Sheet 2.
N. J. SIMONDS.
MOLDING STIFFENERS FOR BOOTS OR SHOES.

No. 292,514. Patented Jan. 29, 1884.

(No Model.) 10 Sheets—Sheet 3.

N. J. SIMONDS.
MOLDING STIFFENERS FOR BOOTS OR SHOES.

No. 292,514. Patented Jan. 29, 1884.

Fig. 3.

WITNESSES.
Samuel D. Kelley.
Eugene Humphrey

INVENTOR.
Nathan J. Simonds
per Porter & Hutchinson
Attys.

(No Model.) 10 Sheets—Sheet 6.

N. J. SIMONDS.
MOLDING STIFFENERS FOR BOOTS OR SHOES.

No. 292,514. Patented Jan. 29, 1884.

(No Model.) 10 Sheets—Sheet 7.

N. J. SIMONDS.
MOLDING STIFFENERS FOR BOOTS OR SHOES.

No. 292,514. Patented Jan. 29, 1884.

Fig. 8.

WITNESSES.
Samuel D. Kelley
Eugene Humphrey

INVENTOR.
Nathan J. Simonds
per Porter & Hutchinson
Attys (No Model.) 10 Sheets—Sheet 9.

N. J. SIMONDS.
MOLDING STIFFENERS FOR BOOTS OR SHOES.

No. 292,514. Patented Jan. 29, 1884.

(No Model.) 10 Sheets—Sheet 10.

N. J. SIMONDS.
MOLDING STIFFENERS FOR BOOTS OR SHOES.

No. 292,514. Patented Jan. 29, 1884.

Fig. 11.

WITNESSES
Samuel D. Kelley.
Eugene Humphrey

INVENTOR.
Nathan J. Simonds
per Porter & Hutchinson
attys

UNITED STATES PATENT OFFICE.

NATHAN J. SIMONDS, OF WOBURN, MASSACHUSETTS.

MOLDING STIFFENERS FOR BOOTS OR SHOES.

SPECIFICATION forming part of Letters Patent No. 292,514, dated January 29, 1884.

Application filed February 2, 1883. (No model.)

*To all whom it may concern:*

Be it known that I, NATHAN J. SIMONDS, of Woburn, in the State of Massachusetts, have invented an Improvement in Molding Boot or Shoe Stiffeners, of which the following is a specification.

This invention relates to molding the stiffeners which are placed between the inner and outer wall at the heel portion of boots and shoes; and the invention consists both in the mechanical devices which I employ, and in the method or process by which I carry my improvement into practical effect, all which will, by the aid of the accompanying drawings, be hereinafter fully described.

It has long been the practice to first give to the stiffener-blank an imperfect molded form, the same being effected by either subjecting them to pressure between male and female molds or by passing them between suitably-formed rolls, after which these imperfectly-molded stiffeners are subjected to heavy pressure between a male and female mold, this latter process being intended to impart to the stiffener a smooth, hard, uniform finish as well as a more perfect shape, and when the stiffeners are somewhat moist, when first molded, they are entirely dried before being so remolded.

As divers patents have been granted for the means and method of so molding and remolding stiffeners, a further reference thereto is not here deemed necessary.

My improved method more especially relates to molding; and it primarily consists in subjecting the stiffener to two operations in the process of molding—not, be it understood, for the mere purpose of repeating the molding pressure or process upon the stiffener, but in two different sets of molds of different form, in one set of which the front portion of the stiffener is molded while it is being held by contact with its rear portion, after which its rear portion is subjected to pressure in the other set of dies while it is held by contact with its front part.

Figure 1:
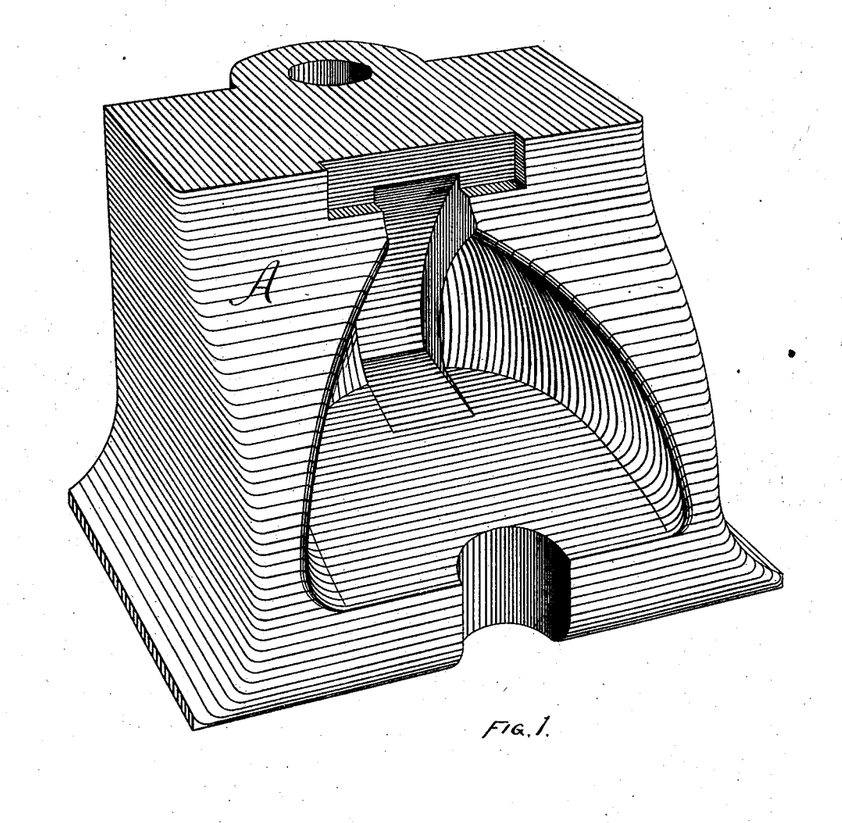
Figure 1 represents in perspective the female mold which I employ in the performance of the first stage or part of my method, the mold being shown in said figure as upside down as compared with its position when in actual use, it being so shown for convenience of view.
Figure 2:
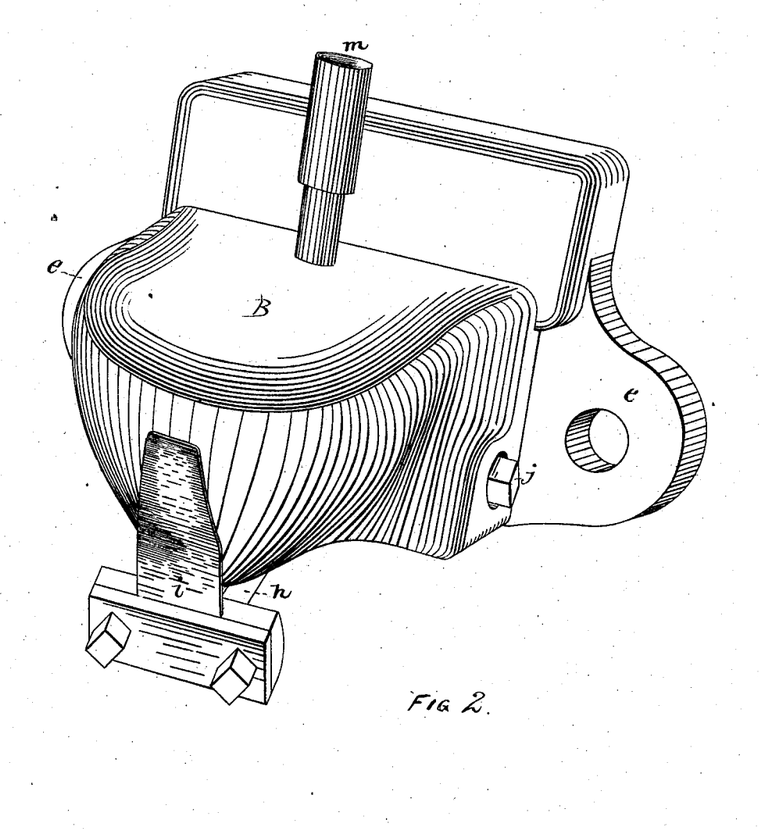
Fig. 2 is a perspective view of the male mold which is employed in co-operation with the mold shown in Fig. 1, this mold being shown in position as used, and a part of the stiffening-holding devices being also shown in perspective.
Figure 3:
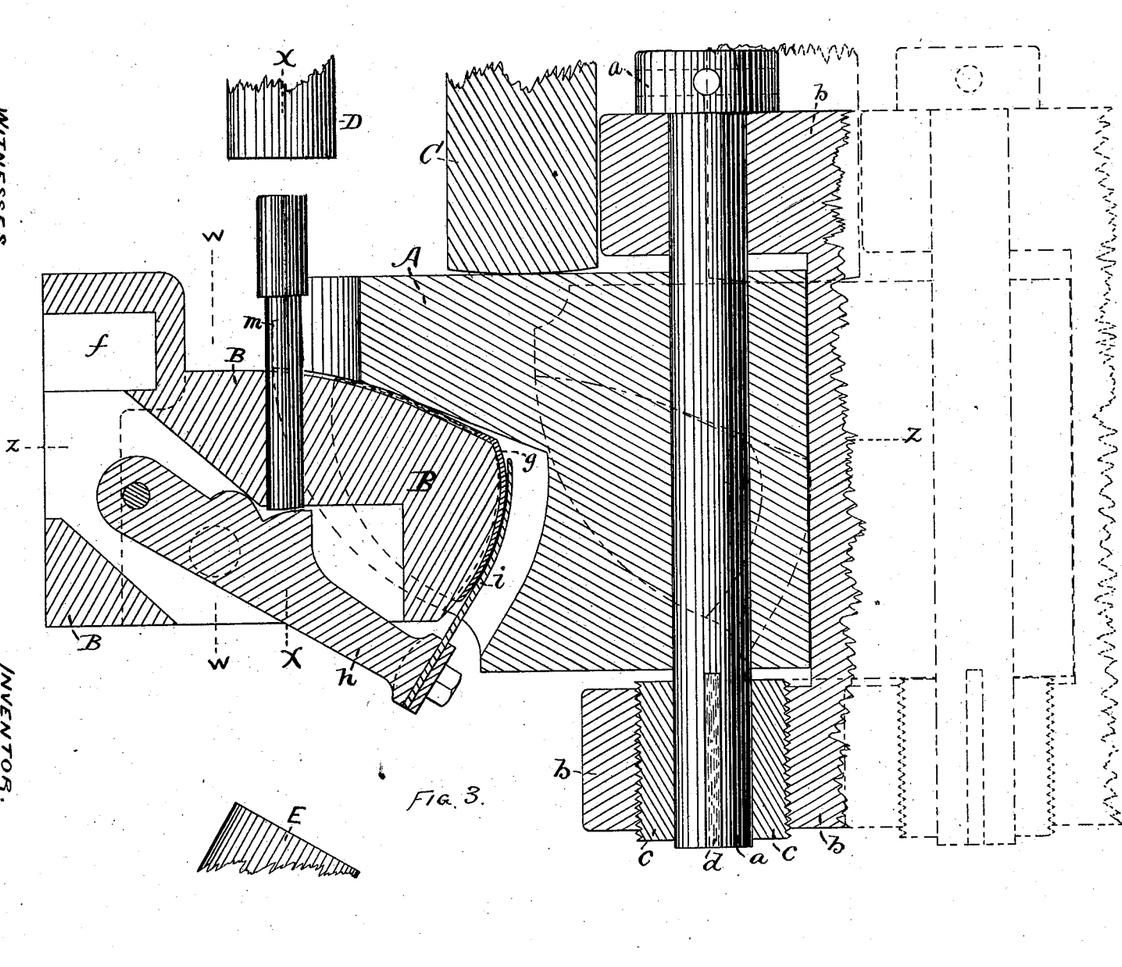
Fig. 3 is a longitudinal vertical section taken as on line $y\ y$, Fig. 4, and through the center of the molds shown in Figs. 1 and 2, and showing the same and the stiffener-holding devices in co-operation as molding a heel-stiffener.

For the purpose of carrying into effect the first step or stage of my said process or method, I have invented the male and female molds shown in Figs. 1 and 2, and respectively marked A and B, said molds being formed with such configuration of walls as will impart to the sides and base-flange of the forward portion of the stiffener the desired form and finish when subjected to pressure therein. Mold A is formed, as shown, to be pivotally mounted upon its supporting-bolt $a$, which is secured in head $b$, Fig. 3, a nut, $c$, being threaded in said head and connected with said bolt by a spline, $d$, whereby the rotation of said bolt serves to raise or lower said nut, as desired; and as mold A is primarily supported by said nut, therefore the mold can be thereby adjusted at the desired height, to properly engage the stiffener $g$, placed on mold B. Said mold A is allowed a slight vertical movement in head $b$, and it is weighted with a weight, C, as shown in Fig. 3. Mold B is formed with perforated ears $e$, by which to bolt it to a suitable supporting-head, and it has also a recess, $f$, formed in its flange, to receive a supporting-tenon of such head.

Figure 6:
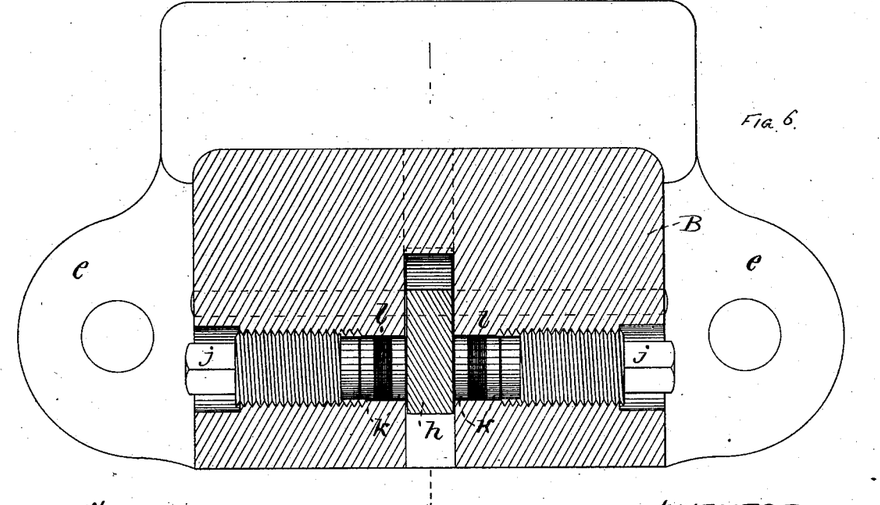
Fig. 6 is a view similar to Fig. 5, but taken as on line $w\ w$ in said Figs. 3 and 4.

For the purpose of supporting stiffener $g$ while being operated upon in the molds, a lever, $h$, is pivoted in a central slot in mold B, and the stiffener-holding spring $i$ is mounted in the free end of said lever, as shown in Figs. 2, 3; and to hold this lever and its spring $i$ in position when raised and in contact with the stiffener, as shown in Fig. 3, two set-screws, $j$, are threaded in the body of mold B, as shown in Fig. 6, and a cushioning-disk, $l$, is arranged between two metal disks, $k$, which are respectively seated next to said lever, and a set-screw, $j$, whereby an elastic pressure is constantly exerted upon each side of the lever, while no abrasion is occasioned to said elastic washers when the lever is forced up and down, which movements of the lever are all effected by the automatic striking of hammer D upon pin $m$, to throw down said lever, and by the automatic striking of hammer E against the lower side of the lever to force it upward, which movements are so timed by automatic strikers that lever $h$ will be depressed and the stiffener liberated when the molds are separating, and said lever will be raised as the molds begin to approach each other, the stiffener being removed and another placed in position while the lever is depressed.

Figure 4:
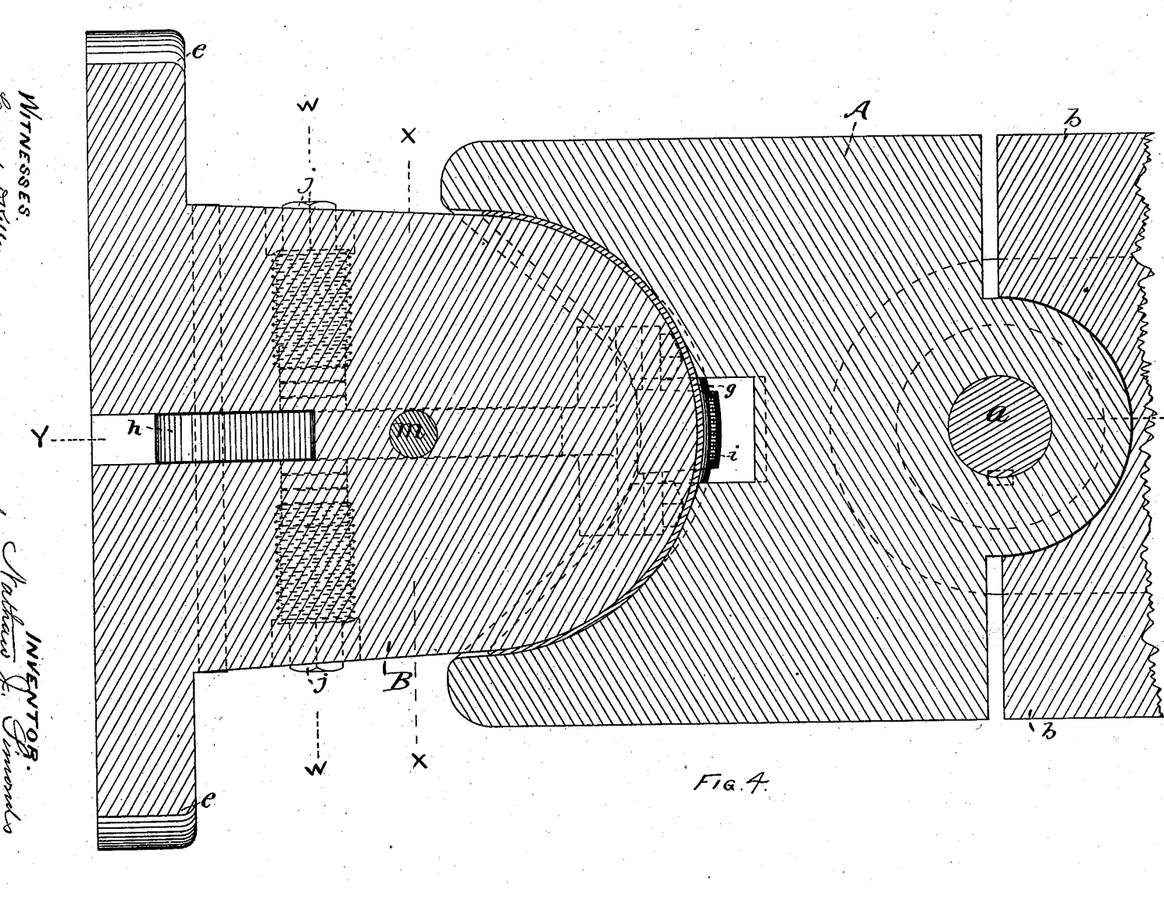
Fig. 4 is a horizontal section taken as on line $z\ z$, Fig. 3, and showing the molds as in the same position as in said Fig. 3.
Figure 5:
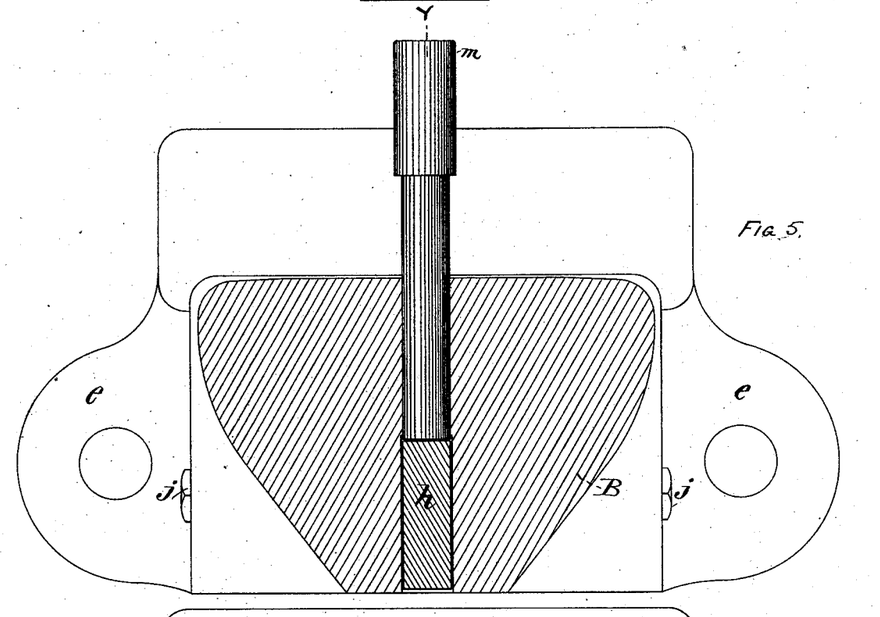
Fig. 5 is a detached vertical section taken through the male mold shown in Fig. 2, and as taken on line $x\ x$, Figs. 3 and 4.
Figure 7:
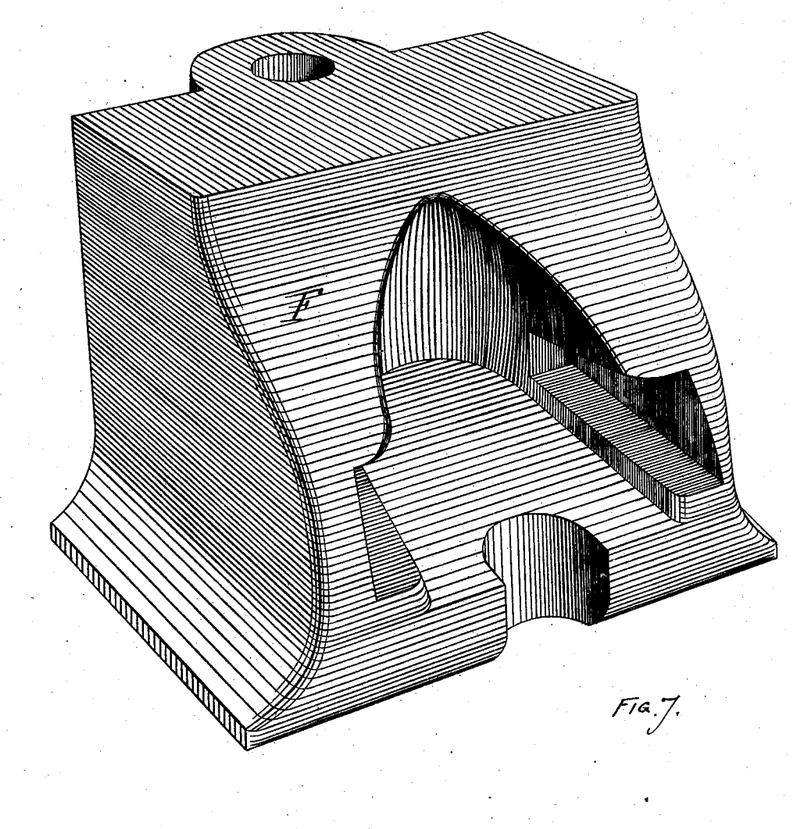
Fig. 7 is a perspective view of the female mold which I employ in the second stage of my method, said mold being, for convenience of view, shown as inverted relatively to its working position.
Figure 8:
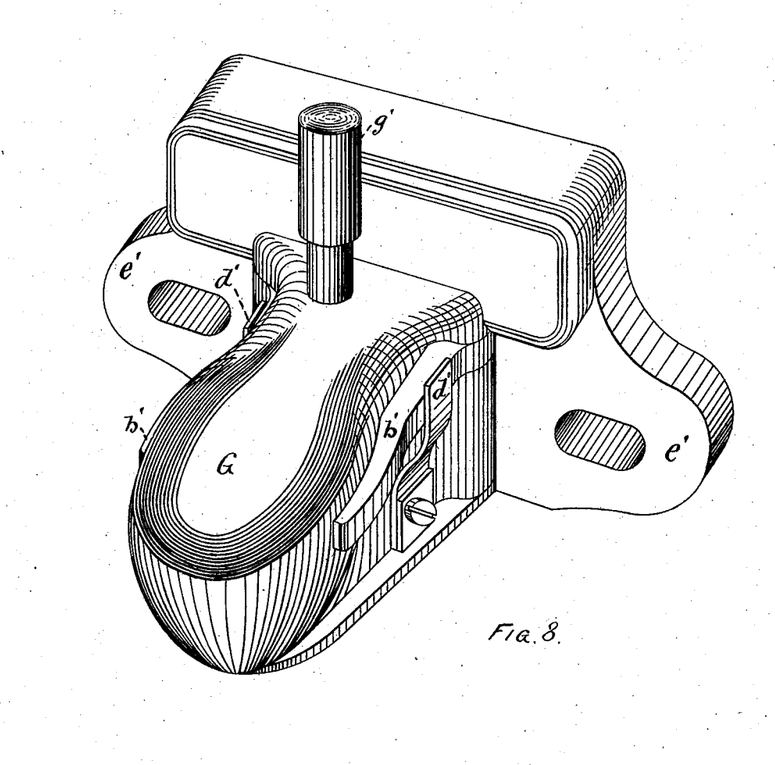
Fig. 8 is a perspective view of the male mold which I employ in co-operation with the female mold shown in Fig. 7.
Figure 9:
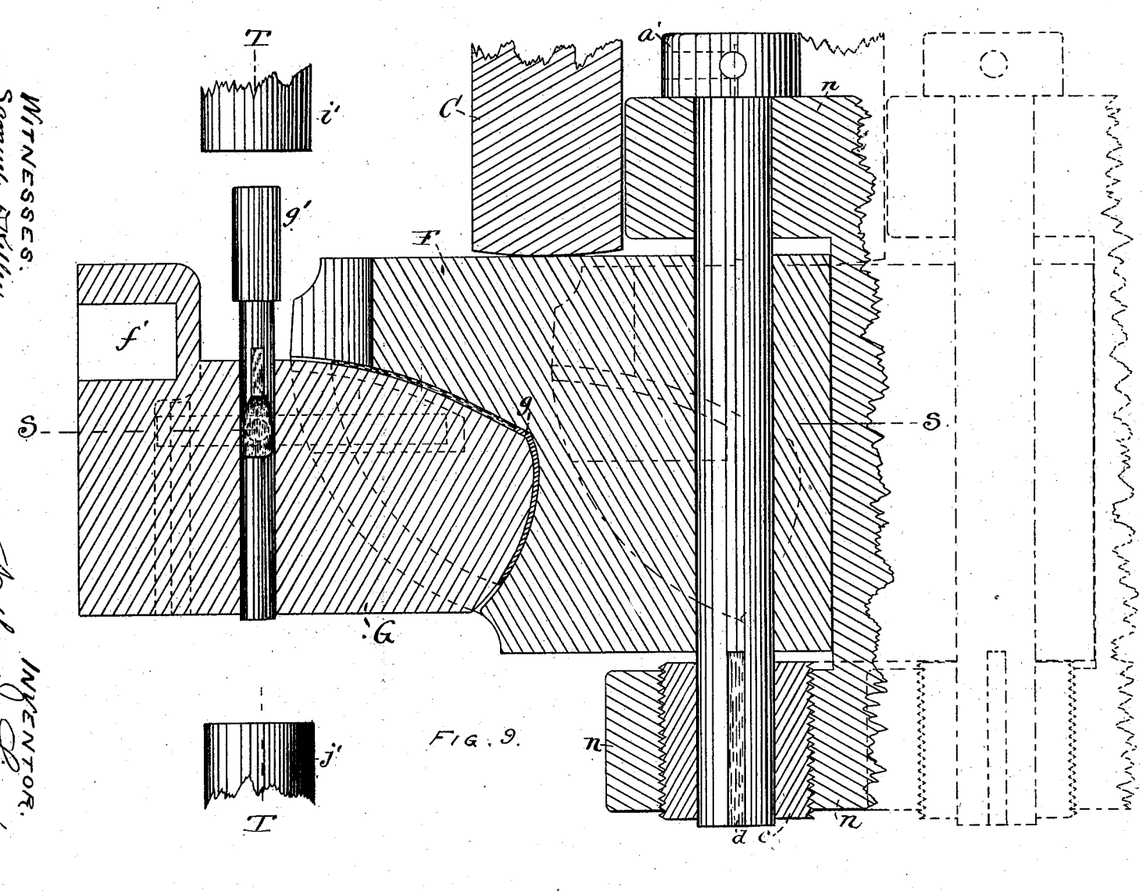
Fig. 9 is a longitudinal vertical section taken through the center of the molds shown in Figs. 7, 8 as on line $v\ v$, Fig. 10, and showing the molds as in the act of molding a stiffener.
Figure 10:
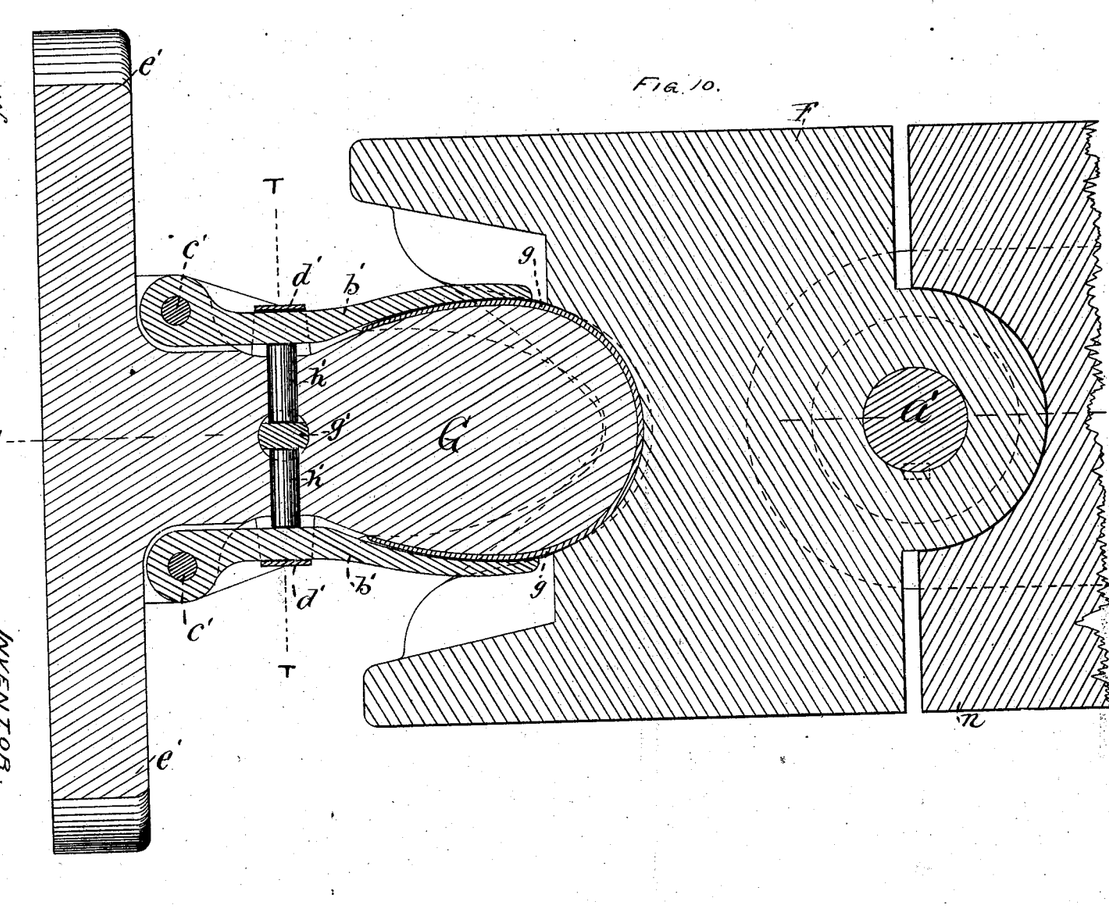
Fig. 10 is a horizontal section taken as on line $s\ s$, Fig. 9, and showing the molds in the same relation, and also showing the stiffener-clamping devices.

As shown in Figs. 1, 3, 4, the rear of mold A is recessed to receive spring $i$ and the free end of lever $h$, as it is neither necessary or desirable that the rear or apex of the curve of the stiffener should be subjected to pressure at the first stage of my molding process. After the stiffeners have been subjected to pressure in this pair of molds, they are subjected to pressure in the molds shown in Figs. 7 to 11, which constitutes the second stage of my process, which said molds are described as follows:

F, Fig. 7, represents in perspective the female mold which I employ in said second stage, which mold is formed with a cavity corresponding with and adapted to receive the rear portion of the coacting male mold G, (shown in Fig. 8,) as is clearly shown in Fig. 10. Said female mold is formed to be secured to its supporting-head by a pivotal pin or bolt, $a'$, in the same manner as is mold A, and mold G is formed with perforated ears $e' e'$ and a recess, $f'$, to receive a supporting-tenon, by which to secure it to the actuating head, as described with reference to mold B.

For securing the stiffener upon mold G, a pair of gripping-jaws, $b' b'$, pivoted at $c' c'$, are arranged to bear against the sides of stiffener $g$ by means of springs $d' d'$, secured to the body of the mold, and arranged to automatically force said jaws against the stiffener.

Figure 11:
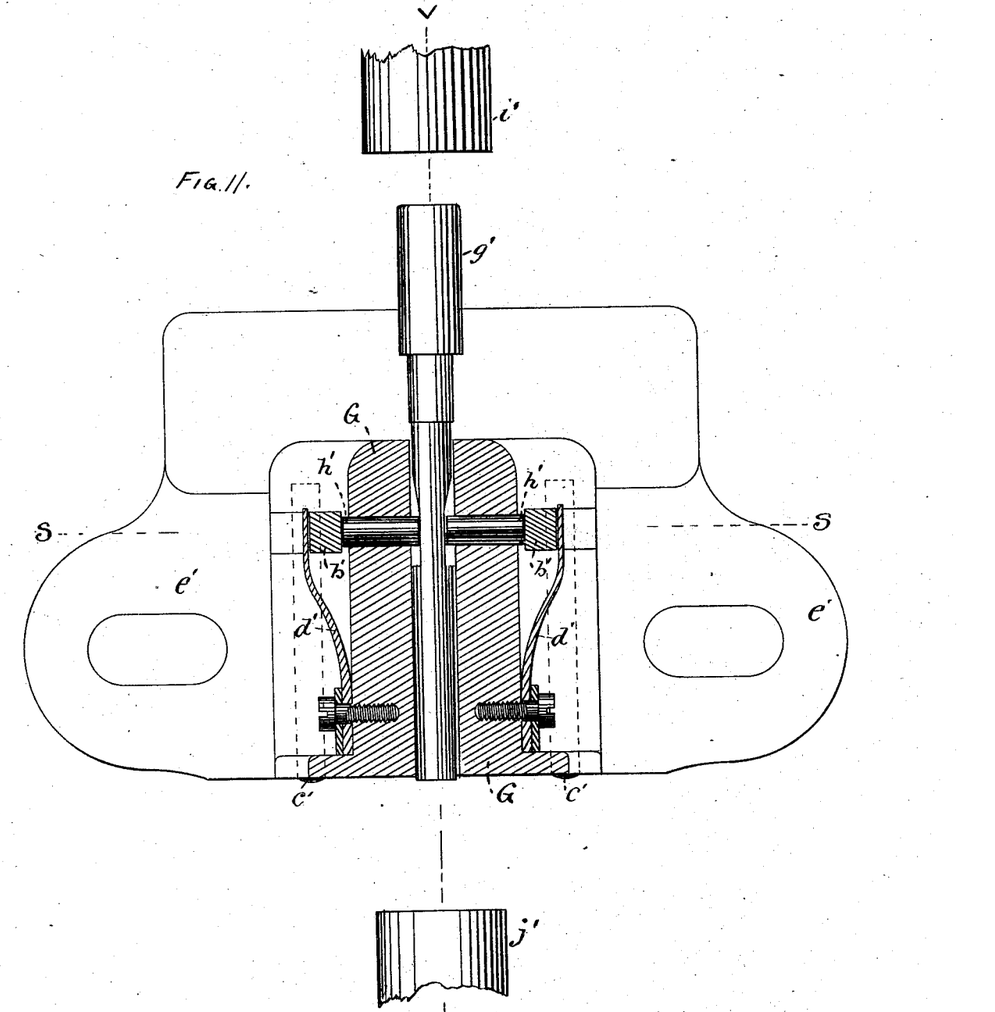
Fig. 11 is a detached vertical section taken through the male mold shown in Fig. 8, and as on line T T, Fig. 9, the stiffener-clamping devices being also shown.

For the purpose of releasing jaws $b'$ from the stiffener, a releasing-pin, $g'$, is seated in mold G, as shown in Figs. 8, 9, 10, 11, and formed with an incline on each side, near its center, as shown in Fig. 11, against which the sliding pins $h' h'$ are constantly forced by said springs $d'$ acting on jaws $b'$, as shown in said figures.

For the purpose of moving the actuating-pin up and down to release jaws $b'$ from the stiffener, and to allow said jaws to engage it, I employ the upper hammer, $i'$, and lower hammer, $j'$, which are respectively actuated by any suitable means arranged to automatically actuate the same at the proper period in relation to the movement of the molds. The female mold F is formed with side recesses to receive the gripping-jaws $b'$ when the molds act upon the interposed stiffener, such recesses being clearly shown in Figs. 7 and 10.

A well molded and formed stiffener is widest at a point about midway between the apex of the heel and the extreme front, as shown in the stiffener in position in the molds in Fig. 10, and as it is impossible to impart this form in a single pair of solid molds, many kinds of hinged female molds which could be closed laterally upon the stiffener when in place on the male mold have been devised and patented, as also expanding male molds with devices to separate or open the same when in position within the stiffener and female mold, a patent having been granted to me for such expanding mold; but all such hinged, sectional, or expanding molds are obnoxious to the objection that, wherever there is a joint or line between two parts of either a male or female mold, there will be formed a corresponding ridge upon the surface of the molded stiffener. Besides this objection in the product, the divers devices requisite to the actuating of such divided molds are highly objectionable, as they are not only liable to be out of order, but seriously interfere with the work of the operator. With my molds and method I entirely obviate all these difficulties and objections, as in neither of the female molds is the mouth contracted, and the male mold enters it with a lineal movement, the two molds employed in the first stage being so formed that the portion of the stiffener embraced between its front end and a distance considerably past its center is molded to the exact curve and form required, while the curve of the rear portion is of a greater radius than is subsequently imparted thereto in the second stage, when the sides of the stiffener are held to the male mold, as shown in Fig. 10, with the points nearer together than in the middle part of the stiffener, when the action of the molds upon the rear portion sets the same, so that all parts of the stiffener retain the position occupied when such last action of the molds occurs, and as a portion of the stiffener toward the rear, which is molded in the first stage of my method, is also acted upon by the mold in the second stage, and such action being, by the form of the molds, less and less toward the outer line of the female mold, therefore no seam, ridge, or other mark is left upon the stiffener, and by means of my said method I am enabled, with solid molds, to mold stiffeners with a widened center and contracted front, which is now regarded by the trade as an indispensable form or contour, which form has only been hitherto and obtained in molded stiffeners by means of sectional male or female molds, or both.

What I claim as my invention is—

1. The herein-described method of molding stiffeners, the same consisting in first subjecting them to pressure in molds adapted to act upon and compress the forward portion thereof, and then repeating such molding in dies adapted to mold the rear portion, and to set the stiffener in form with converging front ends, substantially as specified.

2. The combination of molds A and B, adapted to mold the forward portion of the stiffener, and provided with means for holding the stiffener in position, and the molds F G, adapted to mold the rear portion of such partially-molded stiffener, and to set the same with converging ends when held upon said male mold G, substantially as specified.

3. The combination of molds A and B, adapted to mold the forward portion of a stiffener, and means connected with mold B for holding the stiffener in position thereon, and mold A formed with a rear recess to receive such holding devices of mold B, substantially as specified.

4. In combination with mold B, the pivotal lever $h$, its stiffener-holding spring $i$, compression-screws $j\,j$, dislodging-pin $m$, with elastic buffers between the said screws and said lever-dislodging pin, and means for automatically actuating said pin and lever, substantially as specified.

5. The combination of molds F and G, adapted to mold and set the rear portion of the stiffener, and means connected with mold G for holding the stiffener in position thereon, mold F being formed with side recesses to receive such holding devices of mold G, substantially as specified.

6. In combination with mold G, the vibrating gripping-jaws $b$, with springs to enforce their contact with the stiffener, opening-pins $h'$, sliding pin $g'$, formed with inclines, to actuate pins $h'$, and means to automatically actuate said inclined pins $g'$, substantially as specified.

7. In combination with mold A and its supporting-pin $a$, the screw-nut $c$, threaded in head $b$, and interlocked with said pin by spline $d$, for raising and lowering said nut, substantially as specified.

8. A male and female mold shaped and adapted to mold the forward part of a heel-stiffener, and cut away or recessed at the rear part to form a break in the contour of the mold, whereby when said molds are brought together a space will exist between the male and female mold at the rear portion thereof, substantially as specified.

9. A male and female mold shaped and adapted to mold the rear part of a heel-stiffener, and cut away or recessed at the front part to form a break in the contour of the mold, whereby when said molds are brought together a space will exist between the male and female mold at the front portion thereof, substantially as specified.

NATHAN J. SIMONDS.

Witnesses:
T. W. PORTER,
EUGENE HUMPHREY.